US010156015B2

(12) United States Patent
Liu

(10) Patent No.: US 10,156,015 B2
(45) Date of Patent: Dec. 18, 2018

(54) METHOD FOR COATING OF CARBON NANOMATERIALS

(71) Applicant: Shenzhen Shen Rui Graphene Technology Co., Ltd., Gothenburg (SE)

(72) Inventor: Johan Jianying Liu, Vastra Frolunda (SE)

(73) Assignee: Shenzhen Shen Rui Graphene Technology Co., Ltd., Shenzhen (CN)

( * ) Notice: Subject to any disclaimer, the term of this patent is extended or adjusted under 35 U.S.C. 154(b) by 0 days.

(21) Appl. No.: 14/786,095

(22) PCT Filed: Apr. 17, 2014

(86) PCT No.: PCT/EP2014/057859
§ 371 (c)(1),
(2) Date: Oct. 21, 2015

(87) PCT Pub. No.: WO2014/173793
PCT Pub. Date: Oct. 30, 2014

(65) Prior Publication Data
US 2016/0068965 A1    Mar. 10, 2016

(30) Foreign Application Priority Data

Apr. 21, 2013  (SE) ..................................... 1330038

(51) Int. Cl.
 C23C 18/16      (2006.01)
 C23C 18/18      (2006.01)
 (Continued)

(52) U.S. Cl.
 CPC ...... *C23C 18/1666* (2013.01); *C23C 18/1635* (2013.01); *C23C 18/1676* (2013.01);
 (Continued)

(58) Field of Classification Search
 CPC ............ C23C 18/1635; C23C 18/1639; C23C 18/1642; C23C 18/1666; C23C 18/1692
 (Continued)

(56) References Cited

U.S. PATENT DOCUMENTS 3,650,708 A  *  3/1972  Gallagher ............... C23C 18/26
                                                          205/166
4,833,040 A  *  5/1989  Fishman ................. B22F 1/025
                                                          252/513
(Continued)

FOREIGN PATENT DOCUMENTS

CN      1 699 283 A    11/2005
CN      1732549 A       2/2006
 (Continued)

OTHER PUBLICATIONS

International Search Report (PCT/ISA/210) dated Jul. 15, 2014, by the European Patent Office as the International Searching Authority for International Application No. PCT/EP2014/057859.
 (Continued)

*Primary Examiner* — Dah-Wei D. Yuan
*Assistant Examiner* — Nga Leung V Law
(74) *Attorney, Agent, or Firm* — McDonald Hopkins LLC

(57) ABSTRACT

A method for autocatalytic plating of nanoparticles on a carbon nanomaterial, the method including: providing a nanomaterial in a solution including an oxidizing agent, the solution being maintained within a first temperature range and stirring the solution for a first predetermined time period; heating the solution to reach a second temperature range, higher than the first temperature range, and stirring the solution for a second predetermined time period, shorter than the first time period, while maintaining the solution within the second temperature range; filtering and rinsing the nanomaterial; dispersing the nanomaterial in an aqueous
 (Continued)

solution including a sensitizing agent; immersing the nanomaterial in a mixture including seed particles adhering to the nanomaterial; collecting the nanomaterial; plating the nanomaterial by immersing in a plating solution including an aqueous metal source and a first aqueous reducing agent such that a metallic layer is grown on the nanomaterial from the seed particles.

14 Claims, 4 Drawing Sheets

(51) Int. Cl.
    *C23C 18/31*       (2006.01)
    *B82Y 40/00*       (2011.01)

(52) U.S. Cl.
    CPC ...... *C23C 18/1682* (2013.01); *C23C 18/1689* (2013.01); *C23C 18/1893* (2013.01); *C23C 18/31* (2013.01); *B82Y 40/00* (2013.01)

(58) Field of Classification Search
    USPC ...................................... 427/304, 305, 443.1
    See application file for complete search history.

(56) References Cited

U.S. PATENT DOCUMENTS

| | | | | |
|---|---|---|---|---|
| 6,683,783 | B1* | 1/2004 | Smalley | B01J 19/081 361/502 |
| 2004/0013597 | A1* | 1/2004 | Mao | C23C 18/1635 423/447.1 |
| 2004/0070326 | A1 | 4/2004 | Mai et al. | |
| 2004/0265501 | A1* | 12/2004 | Choi | C23C 18/1632 427/443.1 |
| 2009/0253262 | A1* | 10/2009 | Ivanov | C23C 18/1628 438/674 |
| 2011/0039124 | A1* | 2/2011 | Ikeuchi | C08J 7/045 428/688 |
| 2013/0243974 | A1* | 9/2013 | Jung | C23C 18/1639 427/560 |

FOREIGN PATENT DOCUMENTS

| | | |
|---|---|---|
| CN | 101 481 107 A | 7/2009 |
| CN | 101952906 A | 1/2011 |

OTHER PUBLICATIONS

Written Opinion (PCT/ISA/237) mailed on European, dated Jul. 15, 2014 Patent Office as the International Searching Authority for International Application No. PCT/EP2014/057859.

Chen et al., "Carbon-Nanotube Metal-Matrix Composites Prepared by Electroless Plating", Composites Science and Technology, (Feb. 1, 2000) vol. 60, No. 2, pp. 301-306.

Feng et al., "Electroless Plating Of Carbon Nanotubes With Silver", Journal of Materials Science, Kluwer Academic Publishers, (Jan. 1, 2004) vol. 39, pp. 3241-3243.

Chen, X. et al. "Research for Chemical Nickel-Plating of Carbon Nanotubes" New Carbon Materials, vol. 15, No. 4, Dec. 2000, 17 pages.

Office Action (The Second Office Action) dated Aug. 17, 2017, by the State Intellectual Property Office of the People's Republic of China in corresponding Chinese Patent Application No. 201480021818. X, and an English Translation of the Office Action. (13 pages).

* cited by examiner

=0.2μm

=10nm

METHOD FOR COATING OF CARBON NANOMATERIALS

FIELD OF THE INVENTION

The present invention relates to carbon based nanomaterials, and in particular to the coating of such materials.

TECHNICAL BACKGROUND

Carbon based nanomaterials (CNMs) has drawn plenty of attention recently because of their outstanding mechanical and electrical properties. For instance, carbon nanotubes (CNTs), carbon nano fibers (CNFs) and graphene are ideal raw materials for various applications due to their excellent mechanical characteristics, including high tensile strength and high elastic modulus, as well as high thermal and electrical conductivities.

Thus, research for practical applications of CNMs has been actively pursued. In particular, metal composites incorporating these nanomaterials show promise as new materials offering improved and unique functionality. For instance, metal-CNF composites are expected to have high strength and high thermal conductivity. However, some defects and voids can be detected inside of the composites because of CNFs' poor wettability with molten metals such as tin alloy, aluminum and silver, which is also a common problem existing in all kinds of CNMs. Therefore, surface modification of CNMs is necessary before combining with a metal alloy.

Applying a metal coating on the surface is one of the most effective methods to improve their wettability with molten metals. Metal coating or deposition can also impart various beneficial properties to CNMs, such as high mean density, good solubility in various solvents and desirable magnetic and catalytic properties. A high mean density of metal coated CNMs can prevent them from being removed as impurities by solder flux after reflow. Homogeneous metal coating layers could also act as barriers to prevent nanomaterial from agglomeration thereby making it easier to obtain well-dispersed CNM-suspensions. CNMs coated with ferromagnetic metals can be controllably moved by magnetic fields, which may lead to CNM composites with highly controlled micro-textures. CNMs deposited with catalytic metal particles may provide superior catalysts, with applications such as improved fuel cell electrodes.

Therefore, a uniformly dispersed metal coating layer on the surface of CNMs becomes critical for the achievement of the aforementioned attractive properties. However, the inert nature of CNMs also leads to a weak interaction with the ambient, thus offering a challenge in terms of surface functionalization (including the uniform deposition of metal nanoparticles). Metallic coating processes on CNMs are known, but the normal sensitization process, like simply using Tin (II) ions as the sensitizer to pre-treat the CNMs, does not work very well because of the strong surface inertia of CNMs, and the traditional nitric acid treatment is unable to form enough activated points as the reaction between carbon and nitric acid cannot be precisely controlled. All these factors will have negative effects on the size distribution and uniformity of deposited metal nanoparticles.

SUMMARY OF THE INVENTION

In view of the above-mentioned desired properties of coated nanomaterials, and the above-mentioned and other drawbacks of the prior art, it is an object of the present invention to provide an improved method for autocatalytic plating of carbon nanomaterials.

According to a first aspect of the present invention, it is therefore provided a Method for autocatalytic plating of a carbon nanomaterial, the method comprising the steps of: providing a carbon nanomaterial in an oxidizing solution comprising at least two oxidizing agents, the solution being maintained within a first temperature range and stirring the solution for a first predetermined time period; heating the solution to reach a second temperature range, higher than the first temperature range, and stirring the solution for a second predetermined time period, shorter than the first time period, while maintaining the solution within the second temperature range; removing the nanomaterial from the oxidizing solution; dispersing the nanomaterial in an aqueous sensitizing solution comprising a sensitizing agent; removing the nanomaterial from the sensitizing solution; immersing the nanomaterial in a seed mixture comprising seed particles adhering to the nanomaterial; removing the nanomaterial from the seed mixture; plating the nanomaterial by immersing the nanomaterial in a plating solution comprising an aqueous metal source and a first aqueous reducing agent such that a metallic layer is grown on the nanomaterial from the seed particles; removing the nanomaterial from the plating solution; dispersing the nanomaterial in an aqueous solution comprising a second reducing agent; and heating the solution to reach a third temperature range and performing ultrasonic treatment of the heated solution for a third predetermined time period while maintaining the solution within the third temperature range.

A carbon nanomaterial (CNM) should in the present context be understood as a carbon based material or structure having at least some feature in the nanometer size range.

Autocatalytic plating, also referred to as electroless plating or chemical plating, relates to a process where reactions occur in an aqueous solution without the use of external electrical power.

The steps of removing the carbon nanomaterial from the respective solutions and/or mixtures may be performed by any conventional method know by the skilled person, such as filtering and/or drying.

The present invention is based on the realization that by using at least two different oxidizing agents (multi-oxidants) during a pretreatment step, the surface of the CNMs is oxidized by multi-oxidants which have a strong effect on carbon at a certain temperature range. The degree of oxidation could thereby be precisely controlled by modifying the reaction temperature and reaction time. It is crucial to control the degree of oxidation of the CNM, as a too high degree of oxidation may destroy the structure of the carbon material.

Here, the oxidation is divided into two steps, where a low temperature is maintained for a long time at the beginning of the process to make the oxidants penetrate into the carbon molecule interval. Next, the temperature is increased and maintained for a shorter time to trigger the reaction. At this step, the original stable $sp^2$ carbon-carbon bonds were broken suddenly, and instead, enough reversible oxygen containing groups were formed on the surface of CNMs without breaking the over-all structure of the materials. The temperature may be increased rapidly.

After the surface oxidation, metallic layers were synthesized by electroless deposition process in which the dispersion, size and geometry of the metallic nanoparticles on the surface of CNMs could be well-controlled as a result of the existence of complexing agents and the special property of the reducing agent to deposit refined and homogeneous metal nanoparticles on the substrate surface. Subsequent reduction of metal coated CNMs could remove most of oxygen containing groups from the carbon surface and make the carbon-carbon bonds reform.

In one embodiment of the invention the first temperature range may advantageously be −10 to 10° C. and the first time period 1 h-8 h.

In one embodiment of the invention the second temperature range may advantageously be 30-50° C. and the second time period 10-60 min. It has been found that the above mentioned temperature ranges and time periods allow for efficient oxidation of CNMs without destroying the original structure of the CNMs.

According to one embodiment of the invention the oxidizing agents may advantageously comprise at least two of sulfuric acid, nitric acid, potassium permanganate, potassium dichromate and sodium nitride. By utilizing for example sulfuric acid molecules to penetrate through different layers of CNT and bring the potassium permanganate molecule inside and achieve the oxidation, a sufficient amount of oxidation spots can be formed to facilitate the subsequent metal coating process.

Furthermore, the sensitizing agent may preferably comprise formaldehyde, polyvinylpyrrolidone or tin (II) chloride.

In one embodiment of the invention, the step of removing the nanomaterial from the oxidizing solution may advantageously comprise filtering the nanomaterial and rinsing in de-ionized water until a pH-value of the rinse is approximately 7. Thereby, by monitoring the pH-value, it can be determined that all of the oxidizing agents are removed and that only the carbon nanomaterial remains.

According to one embodiment of the invention the seed particles may advantageously comprise palladium. The palladium may for example be provided from palladium chloride. However, other metals may also be used as seed particles, such as gold silver and copper.

According to one embodiment of the invention the first reducing agent may comprise cobalt sulfate, ferrous chloride, formaldehyde, polyvinylpyrrolidone, ammonia water, ethylenediamine, ethylenediaminetetraacetic acid or benzotriazole.

According to one embodiment of the invention, the step of plating may advantageously comprise removing dissolved oxygen in said solution by ultrasonic wave to avoid oxidation of said reducing agent.

According to one embodiment of the invention the step of plating may be performed in a closed vessel with nitrogen gas passing through said solution.

According to one embodiment of the invention the aqueous metal source may comprise palladium, silver, gold or nickel.

In one embodiment of the invention the aqueous metal source may be a metal ion source selected from the group comprising silver nitride, palladium chlorate, gold chloride, nickel chloride, ammonia water, ammonium sulfate, ethylenediamine and ethylenediaminetetraacetic acid.

In one embodiment of the invention the third temperature range may be 60-100° C. and the third time period may be at least one hour.

In one embodiment of the invention the carbon nanomaterial may be carbon nanotubes, carbon nanofibres or graphene. It is of course also possible to use other similar carbon based nanomaterials. Furthermore, similar carbon nanomaterials may be referred to by different names such as nano rods, nano pillars, nanowires and the like.

In one embodiment of the invention the step of plating may be performed for 0.5 to 24 h. The plating time determines the thickness of the resulting metallic coating on the CNM. Accordingly, it is possible to achieve the desired coating thickness by controlling the time of the plating.

According to one embodiment of the invention, the second reducing agent may advantageously be selected from the group comprising: potassium hydroxide, sodium borohydride, pyrogallol, L-ascorbic acid and hydrazine monohydrate. The second reducing agent is preferably a strong reducing agent.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

This and other aspects of the present invention will now be described in more detail with reference to the appended drawings showing an example embodiment of the invention, wherein.

DETAILED DESCRIPTION OF PREFERRED EMBODIMENTS OF THE INVENTION

In the present detailed description, various embodiments of a method for coating of a nanomaterial according to the present invention are mainly discussed with reference to a carbon nanomaterial (CNM) such as carbon nanotubes, carbon nanofibres or graphene, henceforth referred to as CNM.

Figure 1:
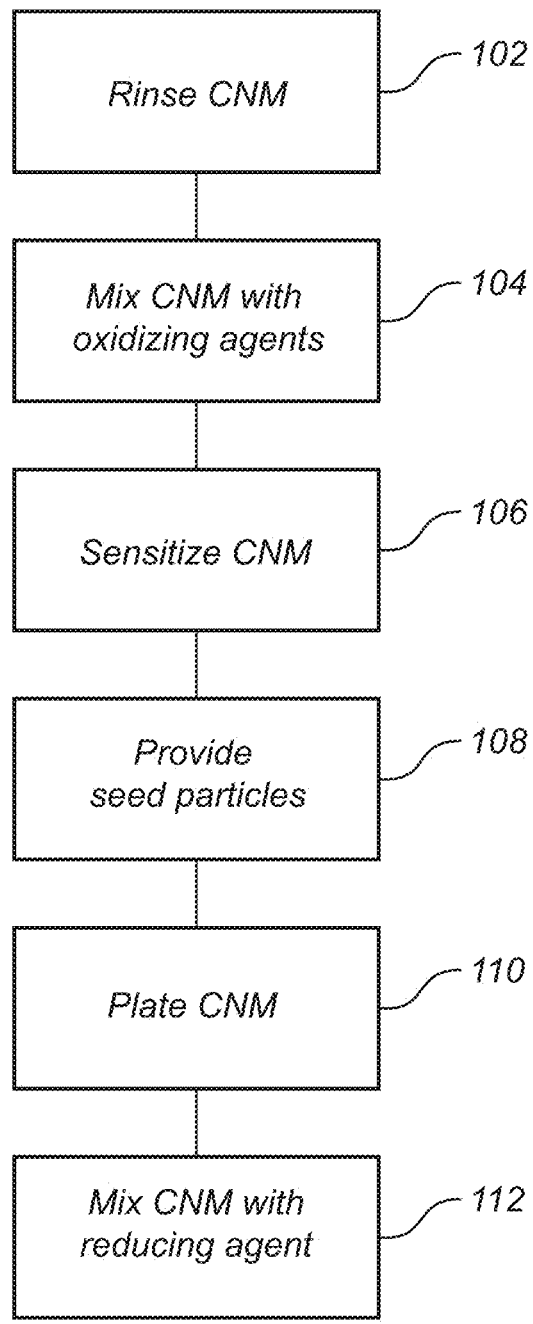
FIG. 1 is a flow chat outlining the general steps of a method according to an embodiment of the invention.

The method for manufacturing a coated nanomaterial will be described with reference to the flow chart of FIG. 1 outlining the general steps of the process.

First 102, the selected CNM is rinsed in acetone and de-ionized water to remove any impurities and protective layers from the surfaces of the CNM.

After rinsing, the CNM is mixed 104 with multiple oxidizing agents at a temperature in the range of about −10 to 10° C., followed by stirring for 1-4 h at that temperature to make sure that the molecules of the oxidizing agent are invading into the surface of CNMs without strong oxidation occurring. The oxidizing agents comprise at least two of sulfuric acid, nitric acid, potassium permanganate, potassium dichromate and sodium nitride. Sulfuric acid and sodium nitride act as intercalation agents to bring the oxidizing agent into the inner layers of the CNT, and the oxidizing agent which may be potassium permanganate do the surface oxidation on CNT. The oxidizing agent should be added into the sulfuric acid very slowly to avoid explosive reactions.

Next, the temperature is increased and controlled to be maintained in the range of 30-50° C. while stirring for about 0.5 h to 3 h.

After that, the oxidized CNM is separated from the solution by using vacuum filtration and the CNM is subsequently washed several times with de-ionized water until the PH of the filtrate is approximately 7 to ensure that the oxidizing agent is fully removed.

Washing is followed by dispersing the oxidized CNM in a sensitizing agent aqueous solution, so that the CNM is sensitized 106. The sensitizing agent may for example be selected to be formaldehyde, polyvinylpyrrolidone or Tin (II) chloride.

After sensitizing, the CNM is activated 108 by immersing into a solution containing palladium chloride, where palladium particles adhere to the CNM, followed by centrifuging and rinsing with distilled water until the pH of the filtrated solution was 7.0. Then, CNM coated with palladium seeds is collected and dried in a vacuum oven. Palladium seed particles are particularly advantageous as nucleation points for subsequent silver growth, since palladium is a good catalyst for triggering a silver self-plating process.

Next, the activated CNM is immersed into an autocatalytic plating solution. The autocatalytic plating solution is prepared as two separate solutions, the aqueous metal ion source solution and the aqueous reducing agent solution, to be mixed in equal amounts prior to plating. Plating 110 is carried out at room temperature and the deposition time depends on the coating thickness needed. For example, the growing rate of metal nanoparticles on the CNM may be about 0.5 nm/h. To avoid oxidation of the reducing agents, the dissolved oxygen in de-ionized water is removed by ultrasonic wave, and deposition is performed in a closed vessel with nitrogen gas passing through the solution. Thereby, a carbon-based nanomaterial having a well defined and homogeneous metal coating is provided without damaging the structure of the carbon nanomaterial.

The aqueous cobalt reducing agent solution may be one or several of the following chemicals: cobalt sulfate, ferrous chloride, formaldehyde, polyvinylpyrrolidone, ammonia water, ethylenediamine, ethylenediaminetetraacetic acid and benzotriazole.

The aqueous metal ion source solution could be one or several of silver nitride, palladium chlorate, gold chloride, nickel chloride, ammonia water, ammonium sulfate, ethylenediamine and ethylenediaminetetraacetic acid. Thereby, metals such as palladium, silver, gold and nickel may be coated. Typically, it may be desirable to provide a metal coating having a thickness in the range of 5 to 100 nm.

After the reaction is complete, i.e. after the desired thickness has been reached, the metal coated CNM is filtered and washed until the color of filtrate turns to substantially transparent. The washing is followed by redispersing the CNM in de-ionized water with a strong reducing agent using ultrasonication, 112. The second reducing solution is used to remove the oxygen containing groups on the CNM and could be one or several of the following chemicals: potassium hydroxide, sodium borohydride, pyrogallol, L-ascorbic acid and hydrazine monohydrate. The reduction process is carried out at 60-100° C. for several hours, e.g. between 1 h to 12 h. Finally, a metal coated CNM is filtered out and dried in a vacuum oven until no mass losses are observed.

The morphologies of CNM coated with a silver layer have been examined using transmission electron microscopy (TEM). The elemental composition and structural analysis of the sample have been analyzed using X-ray diffraction (XRD).

Figure 2A:
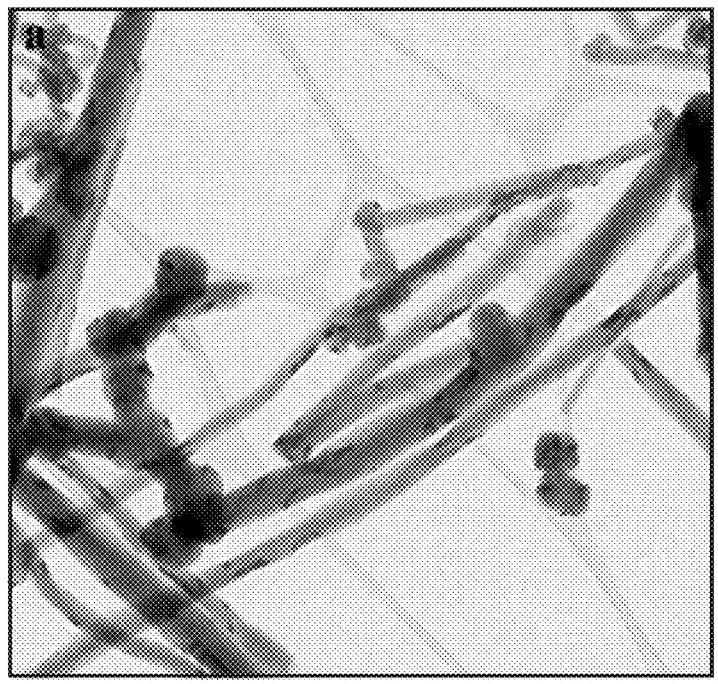
FIGS. 2a-b are TEM images showing a material manufactured according to an embodiment of the invention.
Figure 2B:
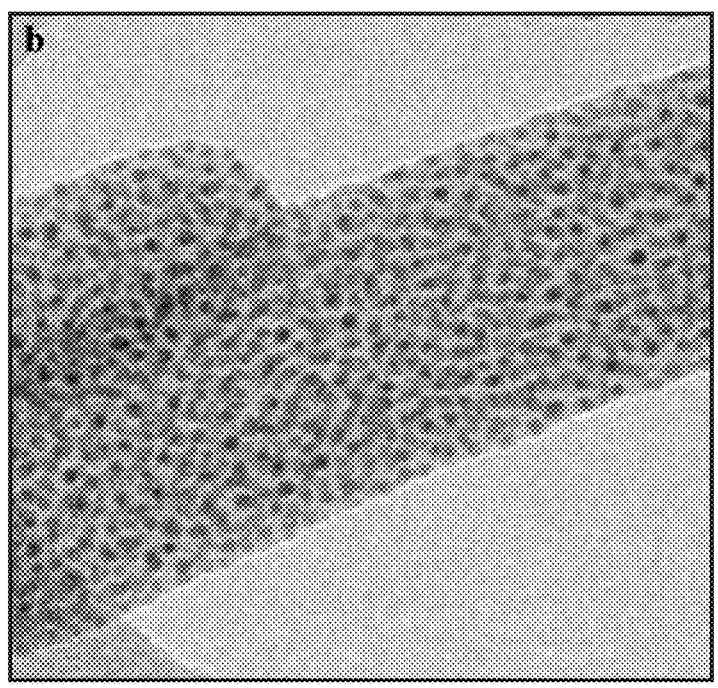

FIG. 2*a* shows a TEM image of pristine carbon nanofibres (CNF), and FIG. 2*b* is an image of carbon nanofibres coated with silver nanoparticles. CNFs having a diameter of 50 nm were selected to demonstrate the coating process. After coating, a layer of silver nanoparticles with a diameter of 3-5 nm was uniformly dispersed on the surface of the CNF without destroying its original structure.

Figure 3A:
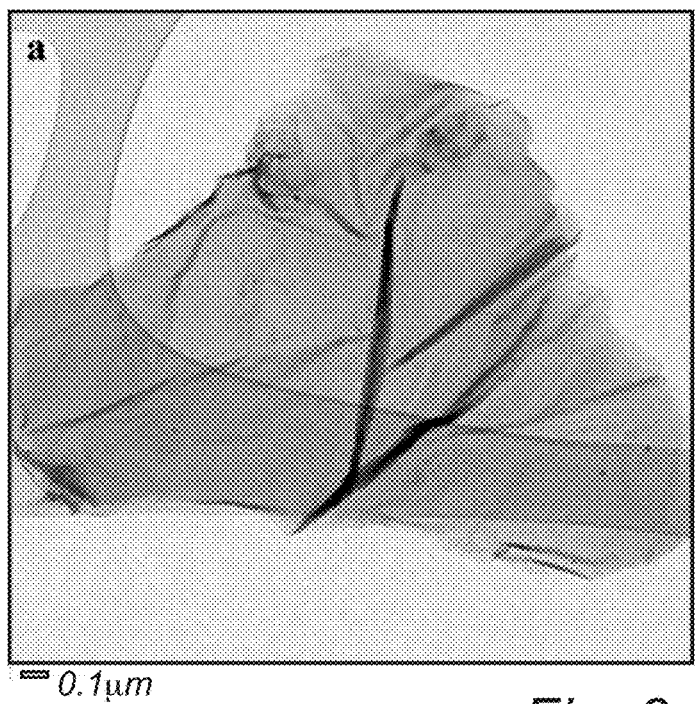
FIGS. 3a-b are TEM images showing a material manufactured according to an embodiment of the invention.
Figure 3B:
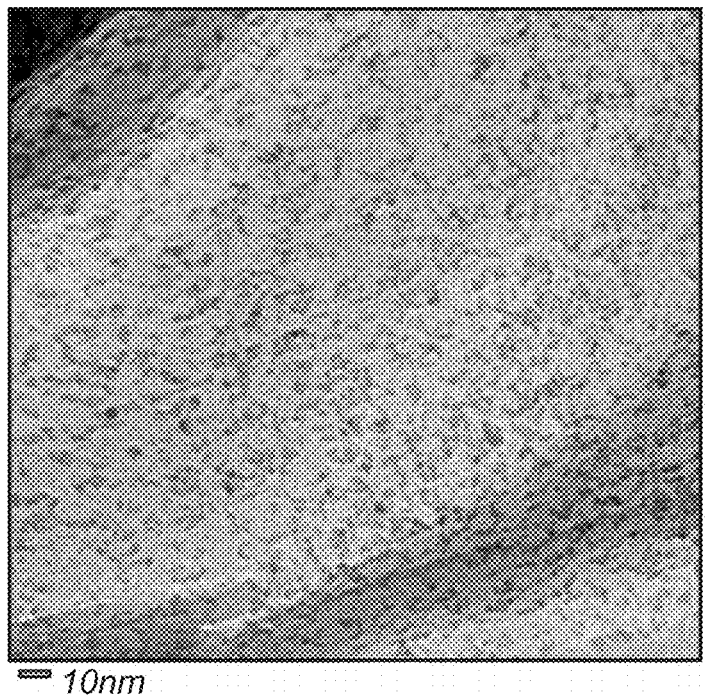

FIGS. 3*a-b* are TEM images showing silver coated graphene at different magnifications. After coating, a layer of silver nanoparticles with a controlled size of 2-3 nm was uniformly dispersed on both sides of the graphene sheet to form the silver/graphene/silver hybrid material. The silver coating layers were thin enough to not affect the properties of graphene.

Figure 4:
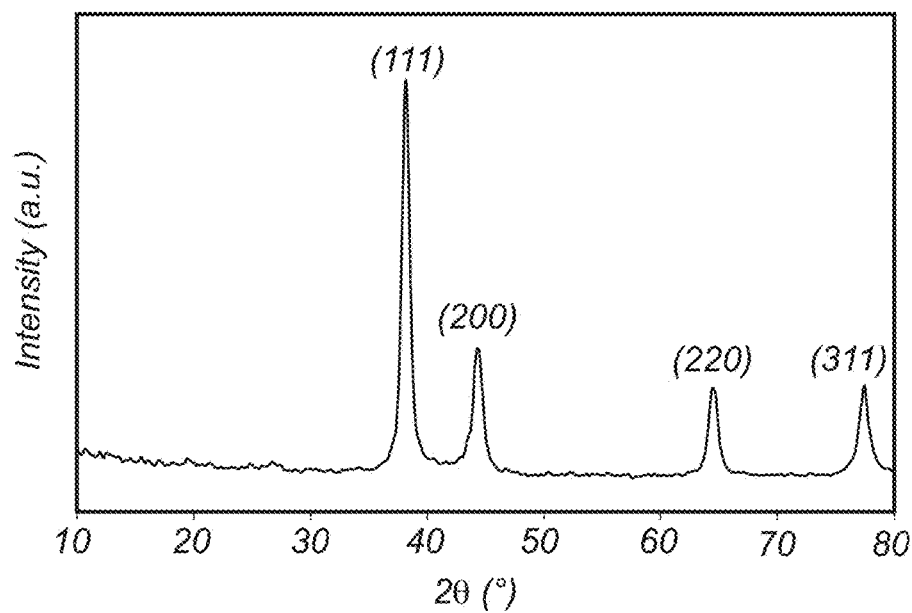
FIG. 4 is an XRD pattern of a material coated according to an embodiment of the invention.

FIG. 4 show X-ray diffraction (XRD) patterns for a silver coated carbon nanofibre sample. The existence of silver is confirmed in the diffraction pattern by the appearance of peaks corresponding to the face-centered cubic (FCC) structure of metallic silver, most notably the (111) reflection.

Even though the invention has been described with reference to specific exemplifying embodiments thereof, many different alterations, modifications and the like will become apparent for those skilled in the art.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality.

The invention claimed is:

1. Method for autocatalytic plating of a carbon nanomaterial, said method comprising the steps of:
    providing a carbon nanomaterial in an oxidizing solution comprising at least two oxidizing agents, said oxidizing solution being maintained within a first temperature range, and stirring said oxidizing solution for a first predetermined time period;
    heating said oxidizing solution to reach a second temperature range, higher than said first temperature range, and stirring said oxidizing solution for a second predetermined time period, shorter than said first time period, while maintaining said oxidizing solution within said second temperature range;
    removing said nanomaterial from said oxidizing solution;
    dispersing said nanomaterial in an aqueous sensitizing solution comprising a sensitizing agent;
    removing said nanomaterial from said sensitizing solution;
    immersing said nanomaterial in a seed mixture comprising seed particles adhering to said nanomaterial;
    removing said nanomaterial from said seed mixture;
    plating said nanomaterial by immersing said nanomaterial in a plating solution comprising an aqueous metal source and a first aqueous reducing agent such that a metallic layer is grown on said nanomaterial from said seed particles;
    removing said nanomaterial from said plating solution;
    dispersing said nanomaterial in an aqueous reducing agent solution comprising a second reducing agent to be reduced by the second reducing agent; and
    heating said aqueous reducing agent solution to reach a third temperature range and performing ultrasonic treatment of said aqueous reducing agent heated solution for a third predetermined time period while maintaining said aqueous reducing agent solution within said third temperature range,
    wherein said oxidizing agents comprise potassium permanganate and sulfuric acid;

wherein said first temperature range is −10 to 10 C and said first time period is 1 to 8 h, said second temperature range is 30 to 50 C and said second time period is 10 to 60 min.

2. The method according to claim 1, wherein said oxidizing agents further comprise at least one of, nitric acid, potassium dichromate and sodium nitride.

3. The method according to claim 1, wherein said sensitizing agent comprises formaldehyde, polyvinylpyrrolidone or tin (II) chloride.

4. The method according to claim 1, wherein said step of removing said nanomaterial from said oxidizing solution comprises filtering said nanomaterial and rinsing in deionized water until a pH-value of the rinse is approximately 7.

5. The method according to claim 1, wherein said seed particles comprises palladium.

6. The method according to claim 1, wherein said first reducing agent comprises cobalt sulfate, ferrous chloride, formaldehyde, polyvinylpyrrolidone, ammonia water, ethylenediamine, ethylenediaminetetraacetic acid or benzotriazole.

7. The method according to claim 1, wherein said step of plating comprises removing dissolved oxygen in said solution by ultrasonic wave such that oxidation of said first reducing agent is avoided.

8. The method according to claim 1, wherein said step of plating is performed in a closed vessel with nitrogen gas passing through said plating solution.

9. The method according to claim 1, wherein said aqueous metal source comprises palladium, silver, gold or nickel.

10. The method according to claim 1, wherein said aqueous metal source comprises a metal ion source, ammonia water, ammonium sulfate, ethylenediamine and ethylenediaminetetraacetic acid, wherein the metal ion source is selected from the group comprising silver nitride, palladium chlorate, gold chloride, and nickel chloride.

11. The method according to claim 1, wherein said third temperature range is 60-100° C. and said third time period is at least one hour.

12. The method according to claim 1, wherein said carbon nanomaterial is carbon nanotubes, carbon nanofibres or graphene.

13. The method according to claim 1, wherein said step of plating is performed for a period of 0.5 h to 24 h.

14. The method according to claim 1, wherein said second reducing agent is selected from the group consisting of: potassium hydroxide, sodium borohydride, pyrogallol, L-ascorbic acid and hydrazine monohydrate.

* * * * *